(12) United States Patent
Oozeki et al.

(10) Patent No.: US 7,613,080 B2
(45) Date of Patent: Nov. 3, 2009

(54) OPTICAL PICKUP DEVICE AND MANUFACTURING METHOD THEREOF

(75) Inventors: Yoshio Oozeki, Yokohama (JP); Hiroaki Furuichi, Kawasaki (JP); Satoshi Arai, Fujisawa (JP); Hideo Sotokawa, Yokohama (JP)

(73) Assignee: Hitachi Media Electronics Co., Ltd., Iwate-ken (JP)

( * ) Notice: Subject to any disclaimer, the term of this patent is extended or adjusted under 35 U.S.C. 154(b) by 583 days.

(21) Appl. No.: 11/232,961

(22) Filed: Dec. 7, 2005

(65) Prior Publication Data

US 2006/0062139 A1    Mar. 23, 2006

(51) Int. Cl.
*G11B 7/00* (2006.01)
(52) U.S. Cl. .................................................. 369/44.14
(58) Field of Classification Search ............... 369/44.14, 369/44.15, 44.16, 44.22
See application file for complete search history.

(56) References Cited

U.S. PATENT DOCUMENTS 6,522,619 B2 *   2/2003   Yanagisawa et al. ........ 369/121
7,246,364 B2 *   7/2007   Yamamoto et al. .......... 369/121

FOREIGN PATENT DOCUMENTS

| JP | 11-326704 | 11/1999 |
|----|-----------|---------|
| JP | 2001-291272 | 10/2001 |
| JP | 2001291272 A * | 10/2001 |
| JP | 2002-251776 | 9/2002 |
| JP | 2003-030883 | 1/2003 |
| JP | 2004-10758 | 1/2004 |
| JP | 2004-178626 | 6/2004 |

* cited by examiner

*Primary Examiner*—Thang V Tran
(74) *Attorney, Agent, or Firm*—Antonelli, Terry, Stout & Kraus, LLP.

(57) ABSTRACT

To provide an optical pickup device in which an optical parts module is fixedly adhered in a high positional precision to an optical pickup case, such that the adhesion strength can be sufficiently enhanced against a stress to be applied to the adhering faces from a flexible printed circuit board connected to the optical parts module, the present invention forms the adhering faces on at least two portions across the optical axis of the optical parts module, and also forms groove portions on the individual surfaces of the optical parts module and the optical pickup case for the adhering faces.

16 Claims, 7 Drawing Sheets

OPTICAL AXIS C

OPTICAL AXIS C

ULTRAVIOLET RAY E (FOR SETTING)

ULTRAVIOLET RAY E (FOR SETTING)

OPTICAL AXIS C

OPTICAL PICKUP DEVICE AND MANUFACTURING METHOD THEREOF

BACKGROUND OF THE INVENTION

The present invention relates to an optical pickup device which is used to record and reproduce an optical disk such as a CD (Compact Disk) or a DVD (Digital Versatile Disk), or to an optical disk drive device having the optical pickup device incorporated thereinto.

In Japanese Patent Laid-Open Publication No. 2004-10758 (hereinafter, referred to as Patent Document 1), there is disclosed a manufacturing method of an optical head device. When an optical element such as a printed circuit board having a light receiving element mounted therein is to be fixedly adhered in a slightly floating state on a frame, the function to adhere the optical element in a high positional precision at a spacing from the frame is borne by a rich filler type highly thixotropic adhesive, and the defect of the rich filler type adhesive to easily cause the floating is compensated by a poor filler type adhesive of low viscosity.

In Japanese Patent Laid-Open Publication No. 2001-291272 (hereinafter, referred to as Patent Document 2), there is disclosed an optical head device, in which an adhesive holding recess to reserve an adhesive is formed in the side face of a frame at the portion to fixedly adhere the frame and an optical director. In this optical head device, when an optically unset adhesive is protruded by a predetermined amount into the adhesive holding recess, the adhesive is homogeneously shaped so that an optical detector can be fixed at a precise position.

In Japanese Patent Laid-Open Publication No. 2002-251776 (hereinafter, referred to as Patent Document 3), there is disclosed an optical detector mounting device for an optical head, which includes: cut portions cut from the two ends of a mounting plate on which an optical detector is mounted; and individual protrusions formed on the side walls of an optical housing and adapted to be inserted into the individual cut portions. The mounting plate is fixed in the optical housing by inserting the individual protrusions into the individual cut portions and by adhering them. Here, parallel grooves are formed in the facial direction of the mounting plate in the faces, on which the individual protrusions and the individual cut portions are adhered. By these grooves, the deviating direction of the adhesive is set in the direction of the grooves.

SUMMARY OF THE INVENTION

Generally, the optical pickup device is used by being housed in a limited space. Therefore, a flexible printed circuit board, which can be freely bent for use, is frequently used for signal transmissions/receptions with an optical parts module. As a result, a stress due to the flexible printed circuit board is always applied to the optical parts module.

Here, the technique described in Patent Document 1 is to compensate the defects of the rich filler type adhesive that the adhesion is weak and that the floating is liable to occur, by reinforcing the adhesion of the periphery of the rich filler type adhesive with the poor filler type adhesive. However, most of the adhering faces between the optical element and the frame are occupied by the rich filler type adhesive of a low adhesion, so that a sufficient adhesion strength cannot be obtained in the aforementioned state where the stress by the flexible printed circuit board is being always applied. As a result, in some cases, the optical element is dislocated to degrade the performance. Moreover, the workability is poor because the poor filler type adhesive has to be applied after the rich filler type adhesive sets.

According to the technique described in Patent Document 2, on the other hand, the adhering faces with the adhesive of the optical detector are flat. Like the technique described in Patent Document 1, therefore, a sufficient adhesion strength cannot be attained in the aforementioned state where the stress by the flexible printed circuit board is always applied. As a result, in some cases, the optical detector is dislocated to degrade the performance.

According to the technique described in Patent Document 3, moreover, the mounting plate is fixed on the optical housing by inserting the protrusions, which are formed on the side walls of the optical housing, into the cut portions which are formed in the two ends of the mounting plates to mount the optical detector, and by adhering the protrusions. Therefore, a sufficient adhesion strength can be obtained even in the state where the aforementioned stress by the flexible printed circuit board is always applied. Because of the configuration, in which the protrusions are inserted into and adhered to the cut portions, however, the degree of freedom for adjustment of the positions of the mounting plates (of the optical detector) with respect to the optical housing is small. As a result, in some cases, the optical detector may not be able to be adjusted to a proper position.

The present invention has been conceived in view of the background thus far described, and has an object to provide an optical pickup device which can fixedly adhere an optical parts module in a high positional precision relative to an optical pickup case and which can acquire a sufficient adhesion strength to a stress by the flexible printed circuit board, and an optical disk device having that optical pickup device incorporated thereinto.

In order to solve the aforementioned problems, according to the invention, on at least two portions across the optical axis of the optical parts module, the optical parts module and the optical pickup case are individually provided with adhering faces having concave portions and/or convex portions. Moreover, the optical parts module is fixed in the optical pickup case by interposing an adhesive between the individual adhering faces confronting the optical parts module and the optical pickup case.

According to the invention, for example, there is provided an optical pickup device comprising: at least one optical parts module; an optical pickup case having said optical parts module fixed thereon through an adhesive; and a flexible printed circuit board connected to said optical parts module, wherein said optical parts module includes adhering faces to said optical pickup case, on at least two portions across the optical axis of said optical parts module, wherein said optical pickup case has adhering faces to said optical parts module, at positions to confront the adhering faces of said optical parts module, and wherein said adhering faces have concave portions and/or convex portions.

On at least two portions across the optical axis of the optical parts module, according to the invention, the optical parts module and the optical pickup case are individually provided with the adhering faces, and the optical parts module is fixed on the optical pickup case so that the adhesive is interposed between the individual confronting adhering faces of the optical parts module and the optical pickup case. This enlarges the degree of freedom of the optical parts module relative to the optical pickup case in adjusting the position thereof. As a result, the optical parts module can be adjusted to a proper position. Moreover, the optical parts module and the optical pickup case are provided with the concave portions and/or the convex portions at their individual adhering faces so that the individual adhesion areas of the optical parts module and the optical pickup case with the adhesive can be enlarged. As a result, a sufficient adhesion strength can be acquired even in the state where the stress by the flexible printed circuit board is always applied.

DETAILED DESCRIPTION

First Embodiment

At the beginning, a first embodiment of the invention is described.

Figure 1:
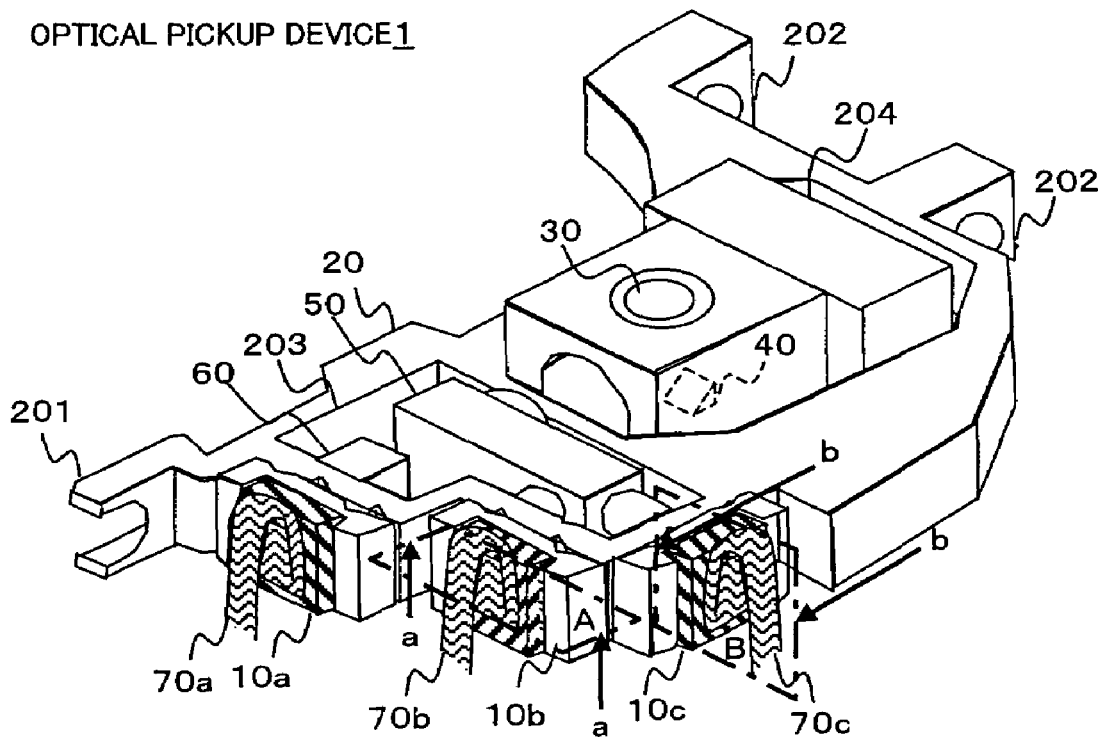
FIG. 1 is a schematic perspective diagram of an optical pickup device 1, to which a first embodiment of the invention is applied.
Figure 2:
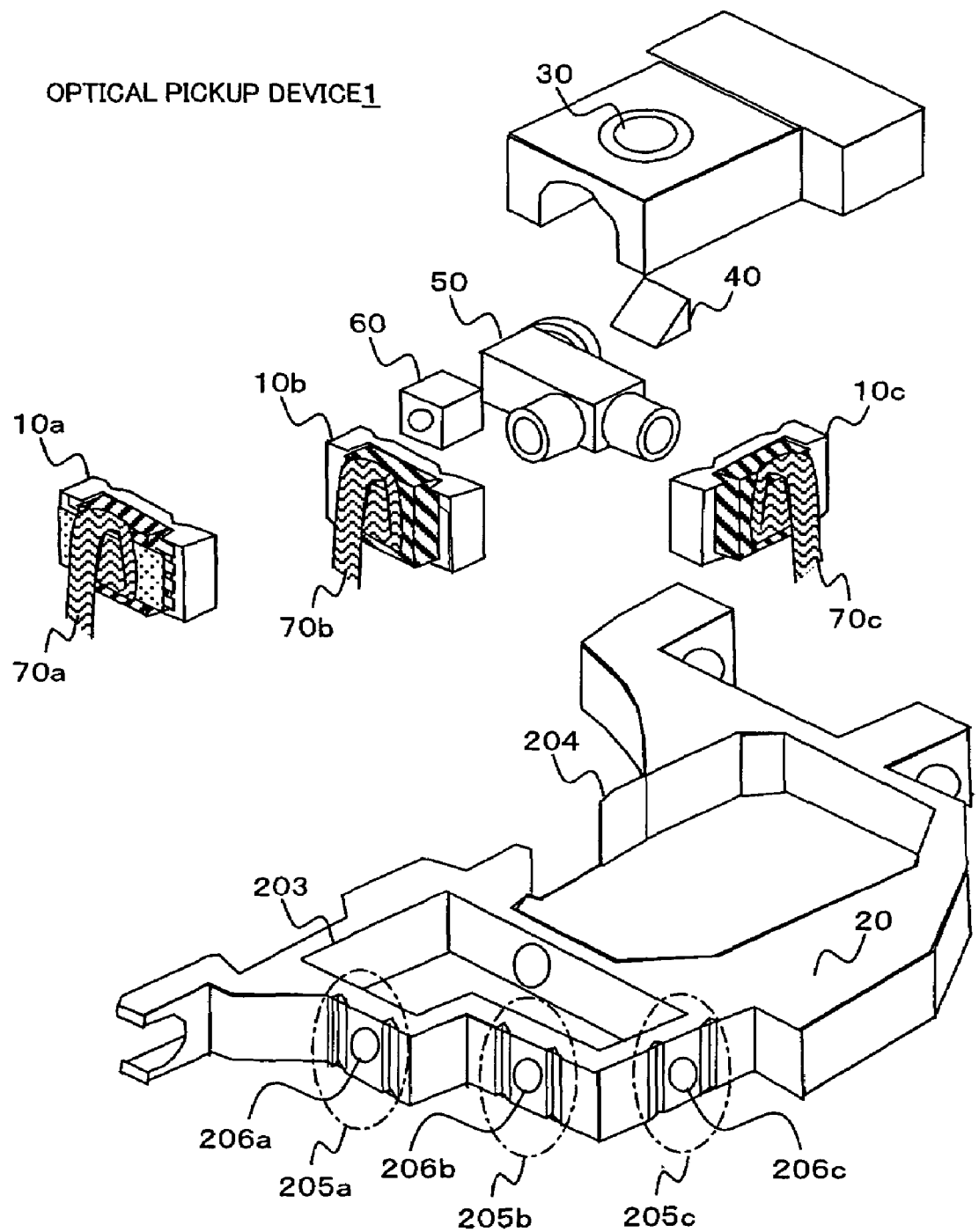
FIG. 2 is an exploded perspective view of components of the optical pickup device 1 shown in FIG. 1.

FIG. 1 is a schematic perspective diagram of an optical pickup device 1, to which a first embodiment of the invention is applied. FIG. 2 is an exploded perspective view of components of the optical pickup device 1 shown in FIG. 1.

As shown, the optical pickup device 1 of this embodiment includes optical parts modules 10a to 10c, an optical pickup case 20, an objective lens 30, a reflecting mirror 40, a prism 50, a lens 60 and flexible printed circuit boards 70a to 70c.

The flexible printed circuit boards 70a to 70c are connected with the optical parts modules 10a to 10c, respectively. The optical parts module 10a is a light receiving parts module. This optical parts module 10a converts the received optical signal into an electric signal and transmits the electric signal through the flexible printed circuit board 70a to the body of the (not-shown) optical disk device to which the optical pickup device 1 is incorporated. On the other hand, the optical parts modules 10b and 10c are light emitting optical parts modules. These optical parts modules 10b and 10c convert the electric signals received from the body of the optical disk device where the optical pickup device 1 is incorporated through the flexible printed circuit boards 70b and 70c, into optical signals so that they emit lights.

The optical pickup case 20 is die-cast mainly of any of Zn, Mg, Al and PPS (poly phenylene sulfide) resin. The optical pickup case 20 includes a first shaft holding portion 201, a second shaft holding portion 202, a first housing portion 203, a second housing portion 204, and optical parts adhering faces 205a to 205c.

The first shaft holding portion 201 and the second shaft holding portion 202 hold the (not-shown) individual shafts of the optical disk device, into which the optical pickup devices 1 are incorporated. The optical pickup device 1 moves along the shafts under the control of the optical disk device having the optical pickup device 1 incorporated. The first housing portion 203 houses the prism 50 and the lens 60. The second housing portion 204 houses the objective lens 30 and the reflecting mirror 40. The optical parts modules 10a to 10c are fixedly adhered to the optical parts adhering faces 205a to 205c. On the other hand, the optical parts adhering faces 205a to 205c are provided with optical path holes 206a to 206c for the optical parts modules 10a to 10c.

In the optical pickup device 1 thus configured, the lights emitted from the optical parts modules 10b and 10c pass through the optical path holes 206b and 206c, are refracted by the prism 50, are reflected by the reflecting mirror 40, and reach the objective lens 30. Moreover, the lights are converged by the objective lens 30 to form optical spots on the information recording surface of the optical disk (not-shown) such as a CD or DVD arranged on the objective lens 50 (i.e., a light transmitting optical system). On the other hand, the return lights from the optical spot formed on the information recording surface of the optical disk reach the optical parts module 10a through the objective lens 30, the reflecting mirror 40, the prism 50, the lens 60 and the optical path hole 206a so that they are received (i.e., a light receiving optical system).

Figure 3A:
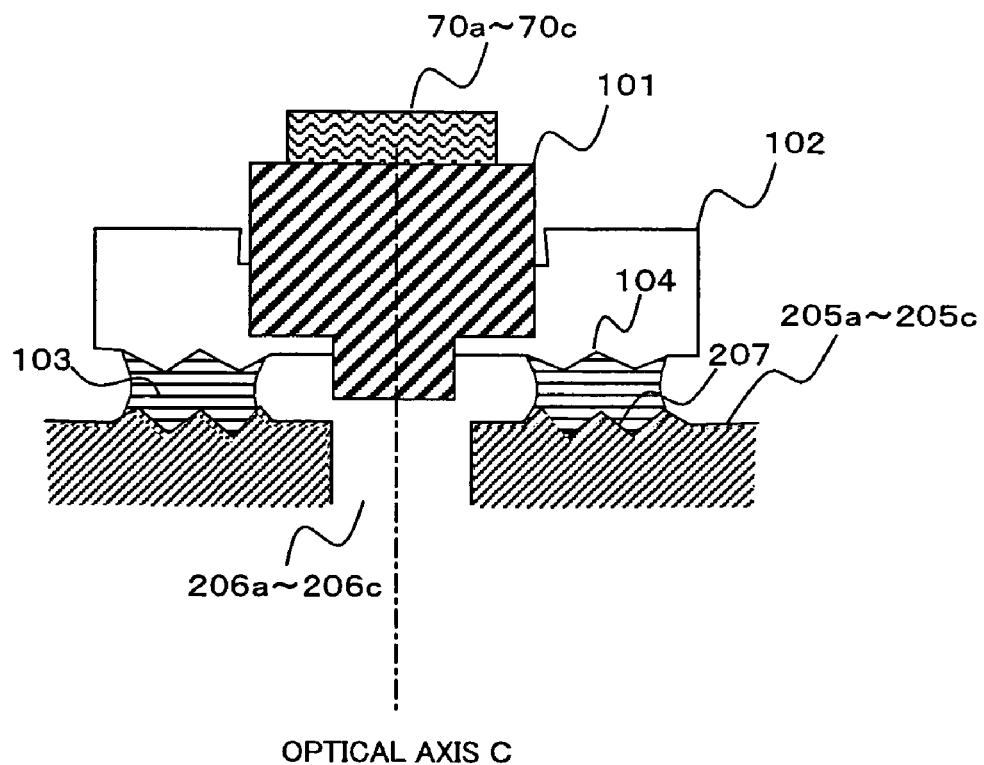
FIG. 3A is a sectional view of optical parts modules 10a to 10c and optical parts adhering faces 205a to 205c of the case, in which a section A is viewed in a direction a in FIG. 1.
Figure 3B:
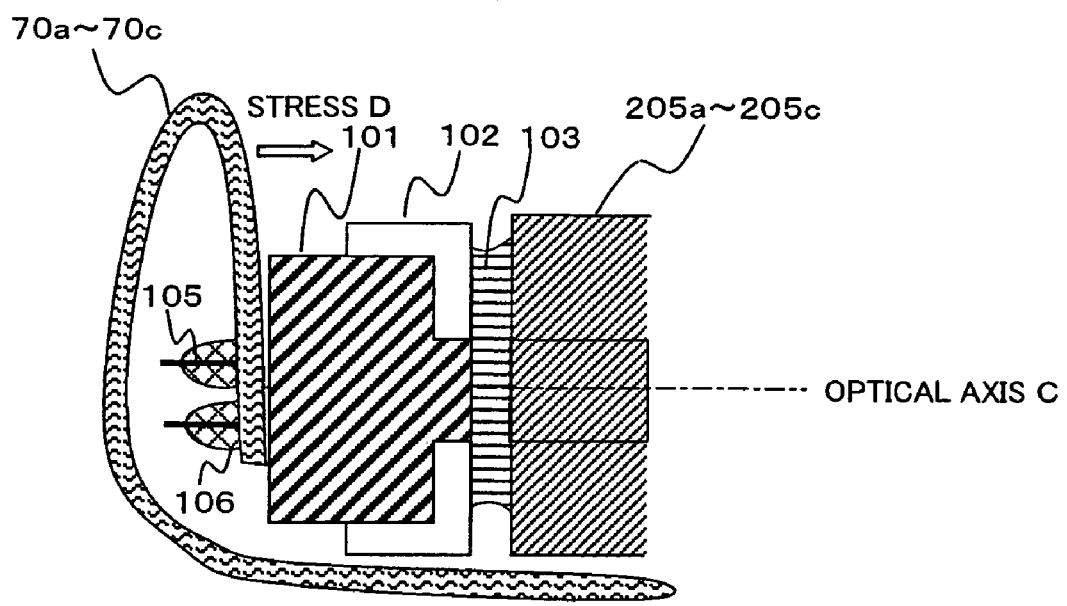
FIG. 3B is a sectional view of the optical parts modules 10a to 10c and the optical parts adhering faces 205a to 205c of the case, in which a section B is viewed in a direction b in FIG. 1.

FIG. 3A is a sectional view of the optical parts modules 10a to 10c and the optical parts adhering faces 205a to 205c of the case, in which the section A is viewed in the direction a in FIG. 1, and FIG. 3B is a sectional view of the optical parts modules 10a to 10c and the optical parts adhering faces 205a to 205c of the case, in which the section B is viewed in the direction b in FIG. 1.

As shown, the optical parts modules 10a to 10c include an optical part 101 having the can configuration or frame configuration (not-shown), in which an optical element is mounted in a sub-mount on a stem, and the holder 102 to hold the optical part 101.

In the optical parts module 10a, a monitoring photo diode is mounted as the optical element of the optical part 101 on the sub-mount. In the optical parts modules 10b and 10c, a light source laser diode is mounted on the sub-mount.

Like the optical pickup case 20, the holder 102 is die-cast mainly of any of Zn, Mg, Al and PPS resin. Moreover, the holder 102 is provided with a case adhering face having the groove portion 104, on the face sides confronting the optical parts adhering faces 205a to 205c and on at least two portions across an optical axis C (or the optical path holes 206a to 206c) of the optical part 101. In the optical parts adhering faces 205a to 205c, moreover, a groove portion 207 is formed at a position to confront the groove portion 104 of the case adhering faces. The groove portion 104 of the case adhering faces and the groove portion 207 of the optical parts adhering faces 205a to 205c are fixedly adhered in the following manner. Specifically, the two groove portions are spaced and filled with an adhesive 103. Next, the optical parts modules 10a to 10c are precisely adjusted in their three-dimensional positions so that the optical part 101 may take the optimum positions in optical characteristics. After this, those two are fixedly adhered as the filling adhesive 103 sets. Here, the adhesive 103 is desirably an ultraviolet ray setting type adhesive of acryl or epoxy family, but may also be exemplified by such an adhesive as has a relatively lowering adhesion strength and a high glass transition temperature.

Figure 4A:
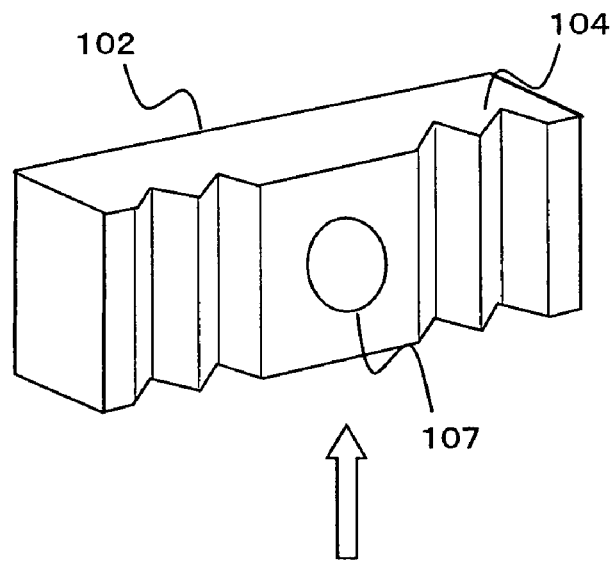
FIG. 4A is a view showing a groove portion 104 of the case adhering face of a holder 102.
Figure 4B:
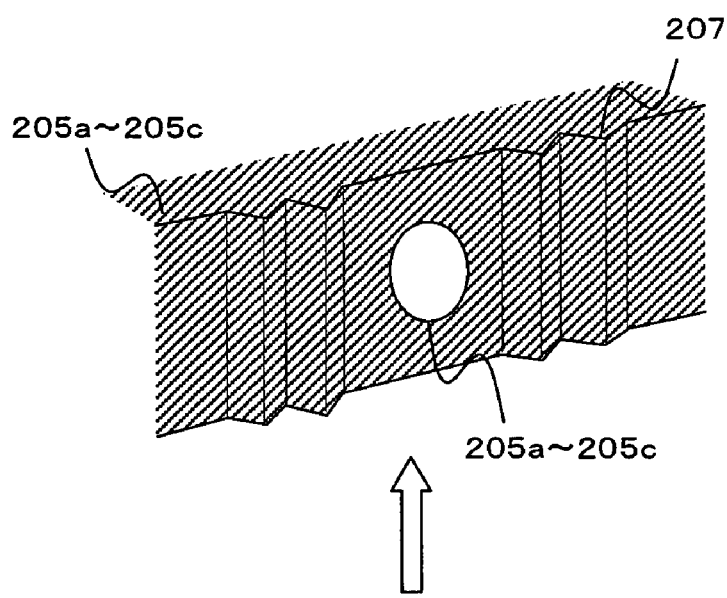
FIG. 4B is a view showing groove portion 207 of the optical parts adhering faces 205a to 205c.

FIG. 4A is a view showing the groove portion 104 of the case adhering face of the holder 102, and FIG. 4B is a view showing the groove portion 207 of the optical parts adhering faces 205a to 205c. In FIG. 4A, reference numeral 107 designates an optical path hole of the optical part 101. As shown, at least one groove of the same shape is formed in the case adhering face and in each of the optical parts adhering faces 205a to 205c. Here, the groove is directed in parallel with the irradiation direction of an ultraviolet ray E, which is irradiated to set the ultraviolet setting type adhesive 103 filled in the groove portion 104 of the case adhering faces and in the groove portion 207 of the optical parts adhering faces 205a to 205c. Thus, the ultraviolet ray E can reach every corner of the adhesive 103 so that the setting of the adhesive can be more completed. Here, the case adhering faces and the optical parts adhering faces 205a to 205c maybe blasted to form a number of asperities of about several μm. Then, the adhesion strength of the adhesive 103 can be further enhanced.

The description is continued by returning to FIG. 3A and FIG. 3B. As shown in FIG. 3B, the flexible printed circuit boards 70a to 70c are connected by means of solder 106 to the electrodes 105 of the optical part 101 (or the printed circuit board (not-shown) to be connected with the optical part 101). Here, it is preferred that the flexible printed circuit boards 70a to 70c are preferably bent for use so that a stress D generated by routing or bending the wires of the flexible boards may act in the direction to push the case adhering faces of the holder 102 onto the optical parts adhering faces 205a to 205c. In the example shown in FIG. 3B, the flexible printed circuit boards 70a to 70c are bent into an L-shape, and the leading end portions of these L-shaped portions are further bent into an inverted U-shape to make their openings confront the bottom side of the L-shape. Moreover, the optical parts modules 10a to 10c are attached to the leading end portions of the inverted U-shape portions.

The first embodiment of the invention has been thus far described.

In this embodiment, in at least two portions of the optical parts modules 10a to 10c across the optical axis C, the optical parts modules 10a to 10c and the optical pickup case 20 are individually provided with the adhering faces (i.e., the case adhering faces and the optical parts adhering faces). The optical parts modules 10a to 10c are fixed on the optical pickup case 20 through the adhesive 103 between the individual opposite adhering faces of the optical parts modules 10a to 10c and the optical pickup case 20. As a result, the degree of freedom to adjust the positions of the optical parts modules 10a to 10c relative to the optical pickup case 20 can be enlarged to adjust the optical parts modules 10a to 10c at proper positions. Moreover, the optical pickup device 1 can be manufactured at a lower cost by improving its production yield.

Moreover, the groove portions are formed in the individual adhering faces of the optical parts modules 10a to 10c and the optical pickup case 20 so that the adhesion areas of the optical parts modules 10a to 10c and the optical pickup case 20 to the adhesive 103 can be enlarged. As a result, a sufficient adhesion strength can be obtained even in the state where the stresses by the flexible printed circuit boards 70a to 70c are always applied. As a result, the satisfactory fixed adhesions can be realized without any dislocation of the optical parts modules 10a to 10c, as might otherwise be caused by the adhesion separation or the drop in the adhesion strength.

Second Embodiment

Next, a second embodiment of the invention is described.

Figure 5A:
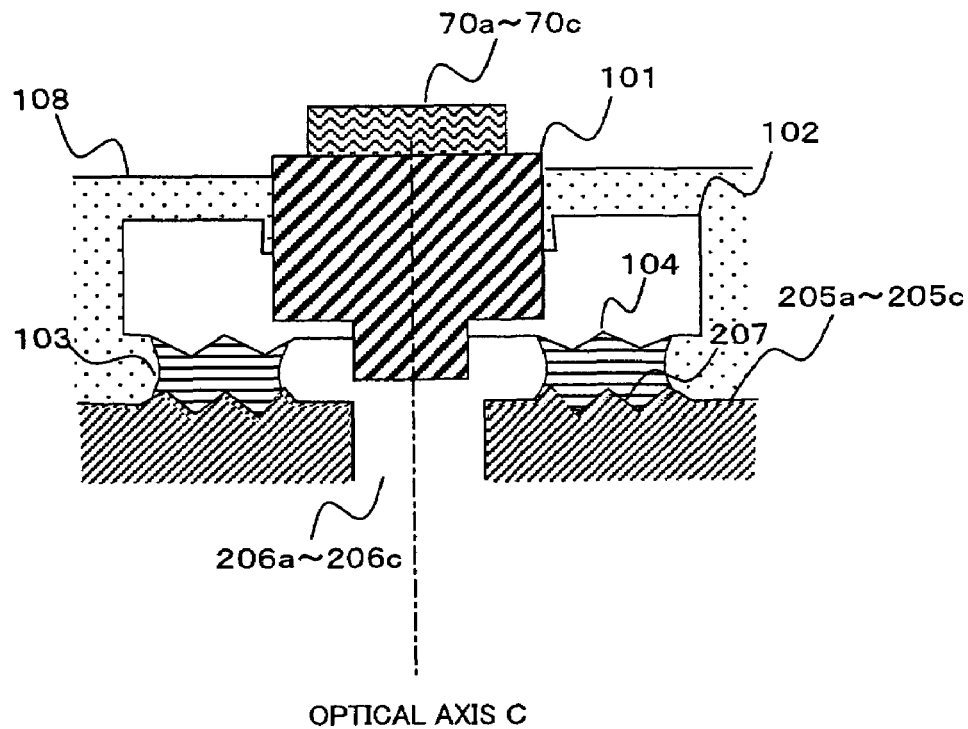
FIG. 5A is a sectional view of the optical parts modules 10a to 10c and the optical parts adhering faces 205a to 205c in the optical pickup device 1, to which a second embodiment of the invention is applied, in case that the section A shown in FIG. 1 is viewed in a direction a in FIG. 1.
Figure 5B:
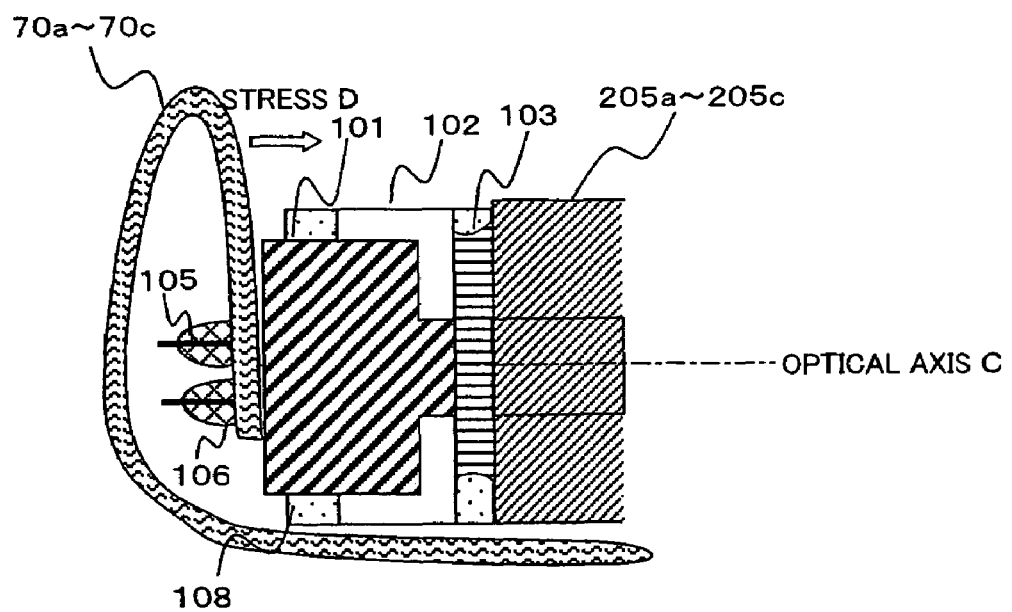
FIG. 5B is a sectional view of the optical parts modules 10a to 10c and the optical parts adhering faces 205a to 205c, to which the second embodiment of the invention is applied, in case that the section B shown in FIG. 1 is viewed in the direction b in FIG. 1.

The schematic perspective view of the optical pickup device 1, to which the second embodiment of the invention is applied, and the exploded perspective view of the components are basically similar to those of the first embodiment shown in FIG. 1 and FIG. 2. FIG. 5A is a sectional view of the optical parts modules 10a to 10c and the optical parts adhering faces 205a to 205c in the optical pickup device 1, to which the second embodiment of the invention is applied, in case the section A shown in FIG. 1 is viewed in a direction a in FIG. 1, and corresponds to FIG. 3A of the first embodiment. FIG. 5B is a sectional view of the optical parts modules 10a to 10c and the optical parts adhering faces 205a to 205c, to which the second embodiment of the invention is applied, in case the section B shown in FIG. 1 is viewed in the direction b in FIG. 1, and corresponds to FIG. 3B of the first embodiment.

In this embodiment, as shown in FIG. 5A and FIG. 5B, a highly heat-conductive adhesive 108 is applied to the optical parts modules 10a to 10c, which are fixedly adhered to the optical pickup case 20 through the adhesive 103, and to the portions of the optical pickup case 20 which is positioned around the optical parts modules 10a to 10c. By applying the highly heat-conductive adhesive 108, the heat, which is generated in the optical parts modules 10a to 10c, is released to the side of the optical pickup case 20. Here, in order to exert no influence on the fixed adhesion by the adhesive 103 between the optical parts modules 10a to 10c and the optical pickup case 20, the highly heat-conductive adhesive 108 is preferably exemplified by an adhesive (e.g., a silicone adhesive) having a sufficiently smaller Young's modulus (a value of an order of $10^6$ Pa (pascal) lower by two or three figures, such as an MPa class or GPa class) than that (a value of an order of $10^9$ Pa) of the adhesive 103.

Third Embodiment

Next, an optical disk device, into which the optical pickup device 1 according to the aforementioned first and second embodiments is incorporated, is described as a third embodiment of the invention.

Figure 6:
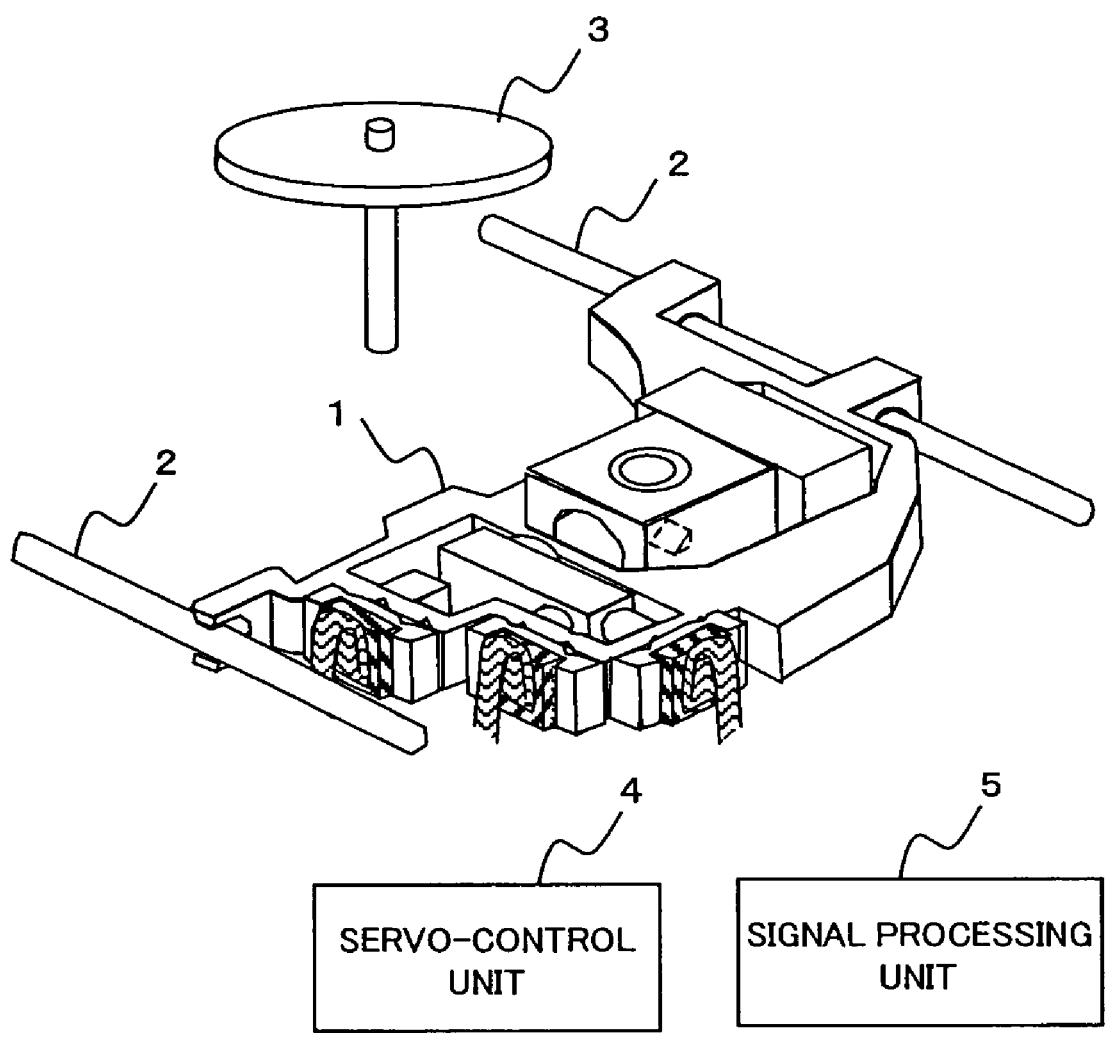
FIG. 6 is a schematic view of an optical disk device, to which a third embodiment of the invention is applied.

FIG. 6 is a schematic view of an optical disk device, to which the third embodiment of the invention is applied. As shown, the optical disk device of this embodiment includes the optical pickup device 1 according to the aforementioned first and second embodiments, shafts 2 to slide and move the optical pickup device 1, a turntable 3 to hold and turn the optical disk such as the CD or DVD, a servo-control unit 4 and a signal processing unit 5.

The servo-control unit 4 turns the turntable 3 thereby to turn the optical disk placed on the turntable 3. Moreover, the optical pickup device 1 is moved to slide along the shafts 2. As a result, the light emanating from the optical pickup device 1 is applied to a desired position of the information recording surface of the optical disk. The signal processing unit 5 reproduces and processes the electric signals photoelectrically converted by the optical pickup device 1.

The embodiments of the invention have been described hereinbefore. Here, the invention should not be limited to the aforementioned individual embodiments but can be modified in various manners within the range of the gist thereof. In the embodiments thus far described, for example, the optical pickup case 20 and the holder 102 of the optical parts modules 10a to 10c are made mainly any of Zn, Mg, Al and the PPS resin, and the adhesive 103 is the ultraviolet ray E setting type adhesive. However, the invention can also be applied to the case using another material (e.g., a metallic material) and another adhesive.

Moreover, the foregoing embodiments have been described on the case, in which at least one groove is formed in each of the optical parts adhering faces 205a to 205c of the optical pickup case 20 and in each of the case adhering faces of the optical parts modules 10a to 10c, although the invention is not limited thereto. It is sufficient to form asperities on each of the optical parts adhering faces 205a to 205c and the case adhering faces.

FIG. 7A to FIG. 7D are sectional views of the optical parts modules 10a to 10c and the optical parts adhering faces 205a to 205c in the optical pickup device 1, to which a modification of the first embodiment of the invention is applied, in case that the section A shown in FIG. 1 is viewed in the direction a in FIG. 1, and correspond to FIG. 3A of the first embodiment.

Figure 7A:
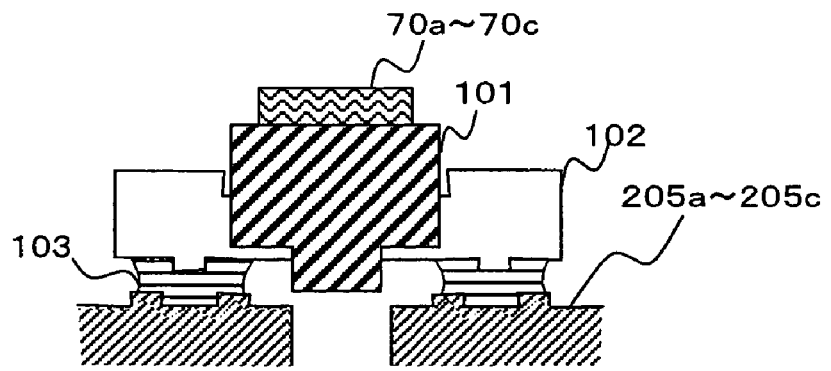
FIG. 7A to FIG. 7D are sectional views of the optical parts modules 10a to 10c and the optical parts adhering faces 205a to 205c in the optical pickup device 1, to which a modification of the first embodiment of the invention is applied, in case that the section A shown in FIG. 1 is viewed in the direction a in FIG. 1.

As shown in FIG. 7A, for example, the case adhering faces of the optical parts modules 10a to 10c and the optical parts adhering faces 205a to 205c, which confront each other, may also be formed so that one is convex whereas the other is concave.

Figure 7B:
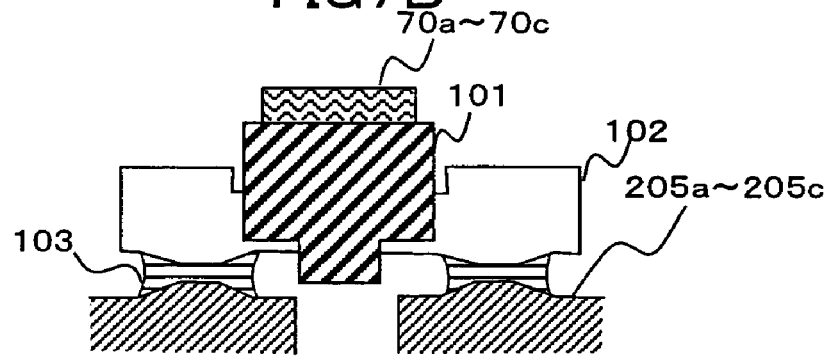

As shown in FIG. 7B, alternatively, the case adhering faces of the optical parts modules 10a to 10c and the optical parts adhering faces 205a to 205c, which confront each other, may also be formed so that the both are convex.

Figure 7C:
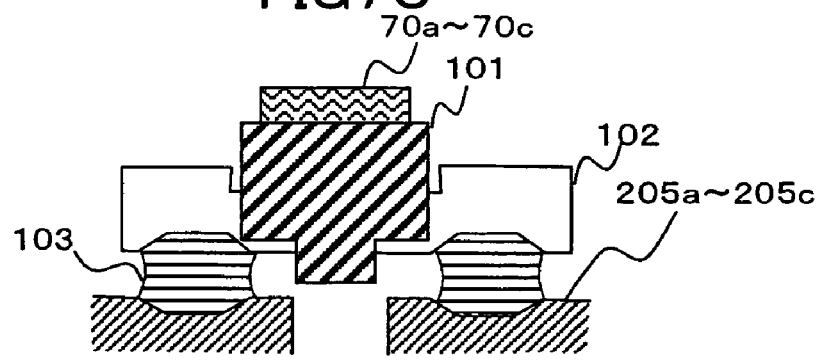

As shown in FIG. 7C, alternatively, the case adhering faces of the optical parts modules 10a to 10c and the optical parts adhering faces 205a to 205c, which confront each other, may also be formed so that the both are concave.

Figure 7D:
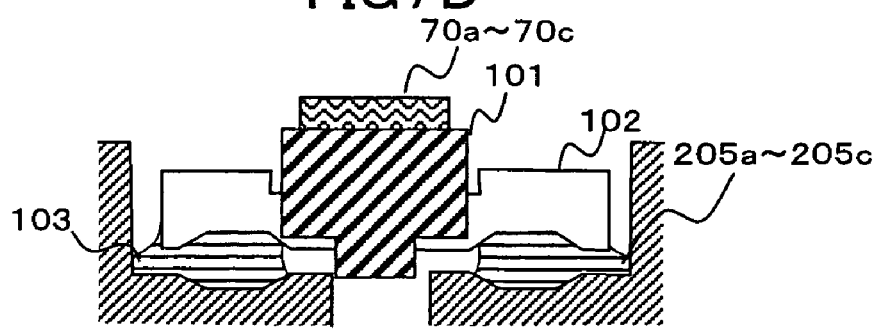

As shown in FIG. 7D, moreover, the optical pickup case may be recessed to form the optical parts adhering faces 205a to 205c therein. Thus, the adhesion area between the optical pickup case 20 and the adhesive 103 can be enlarged to the sides of said recess so that a higher adhesion strength can be expected.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What is claimed is:

1. An optical pickup device comprising:
    at least one optical parts module;
    an optical pickup case having said optical parts module fixed thereon by an adhesive; and
    a flexible printed circuit board connected to said optical parts module;
    wherein said optical parts module includes an adhering face confronting said optical pickup case, on at least two portions across the optical axis of said optical parts module;
    wherein said optical pickup case includes an adhering face, at a position that confronts the adhering face of said optical parts module;
    wherein the adhering face of said optical parts module has at least one of a concave portion and a convex portion; and
    wherein a heat-conductive adhesive is applied to at least one face of said optical parts module other than said adhering face of said optical parts module.

2. The optical pickup device according to claim 1,
    wherein said adhesive is an ultraviolet setting type adhesive; and
    wherein said at least one of a concave portion and a convex portion of said adhering face of said optical parts module includes at least one groove formed along an irradiation direction of an ultraviolet ray used to set said adhesive.

3. An optical device comprising the optical pickup device according to claim 2.

4. The optical pickup device according to claim 2,
    wherein a shape of a cross-section of said groove is at least one of triangular, rectangular, and quadrilateral.

5. An optical device comprising the optical pickup device according to claim 1.

6. The optical pickup device according to claim 1,
    wherein an adhering face of said optical pickup case has at least one of a concave portion and a convex portion.

7. The optical pickup device according to claim 6,
    wherein at least one of said concave portion and said convex portion of at least one of said adhering face of said optical parts module and said adhering face of said optical pickup case is parallel with the lamination direction.

8. The optical pickup device according to claim 6,
    wherein said at least one of a concave portion and a convex portion of one of said adhering face of said optical parts module and said adhering face of said optical pickup case confronts at least one of a concave portion and a convex portion of the other of said adhering face of said optical parts module and said adhering face of said optical pickup case; and
    wherein said adhering faces complement one another.

9. The optical pickup device according to claim 1,
    wherein said flexible printed circuit board is bent; and
    wherein said flexible printed circuit board applies a stress to said adhesive.

10. A manufacturing method of an optical pickup device, comprising:
    forming an optical parts module with an adhering face having at least one of a concave portion and a convex portion on at least two portions across the optical axis of said optical parts module; and
    affixing said optical parts module to an optical pickup case; and
    connecting a flexible printed circuit board to said optical parts module;
    sandwiching an adhesive between the adhering face of said optical parts module and an adhering face of said optical pickup case which confront one another;
    setting said adhesive after a position of said optical parts module is adjusted; and
    applying a heat-conductive adhesive to said optical parts module which is affixed to said optical pickup case by said heat-conductive adhesive.

11. The optical pickup device manufacturing method according to claim 10,
    wherein said adhesive is an ultraviolet setting type adhesive, and
    wherein at least one of a concave portion and a convex portion of said adhering face includes at least one groove formed along an irradiation direction of an ultraviolet ray for setting said adhesive.

12. The optical pickup device manufacturing method according to claim 11, further comprising:

wherein a shape of a cross-section of said groove is at least one of triangular, rectangular, and quadrilateral.

13. The optical pickup device manufacturing method according to claim 10, further comprising:
wherein an adhering face of said optical pickup case has at least one of a concave portion and a convex portion.

14. The optical pickup device manufacturing method according to claim 13, further comprising:
wherein at least one of said concave portion and said convex portion of at least one of said adhering face of said optical parts module and said adhering face of said optical pickup case is parallel with the lamination direction.

15. The optical pickup device manufacturing method according to claim 13, further comprising:
wherein said at least one of a concave portion and a convex portion of one of said adhering face of said optical parts module and said adhering face of said optical pickup case confronts at least one of a concave portion and a convex portion of the other of said adhering face of said optical parts module and said adhering face of said optical pickup case; and
wherein said adhering faces complement one another.

16. The optical pickup device manufacturing method according to claim 10, further comprising:
wherein said flexible printed circuit board is bent; and
wherein said flexible printed circuit board applies a stress to said adhesive.

* * * * *

UNITED STATES PATENT AND TRADEMARK OFFICE
CERTIFICATE OF CORRECTION

PATENT NO.         : 7,613,080 B2                                                    Page 1 of 1
APPLICATION NO.    : 11/232961
DATED              : November 3, 2009
INVENTOR(S)        : Oozeki et al.

It is certified that error appears in the above-identified patent and that said Letters Patent is hereby corrected as shown below:

Title page, Item (22) should read -- (22) Filed:   Sept. 23, 2005 --.

Signed and Sealed this

First Day of June, 2010

David J. Kappos
*Director of the United States Patent and Trademark Office*